United States Patent [19]
Leary et al.

[11] Patent Number: 5,375,228
[45] Date of Patent: Dec. 20, 1994

[54] REAL-TIME SIGNAL ANALYSIS APPARATUS AND METHOD FOR DIGITAL SIGNAL PROCESSOR EMULATION

[75] Inventors: Kevin W. Leary, Walpole; Russell L. Rivin, Norwood, both of Mass.

[73] Assignee: Analog Devices, Inc., Norwood, Mass.

[21] Appl. No.: 651,743

[22] Filed: Feb. 4, 1991

[51] Int. Cl.⁵ .............................................. G06F 11/00
[52] U.S. Cl. ................................................. 395/575
[58] Field of Search ................. 371/19, 22.1, 23, 68.1, 371/24, 67.1; 395/575

[56] References Cited

U.S. PATENT DOCUMENTS

| | | | |
|---|---|---|---|
| 4,674,089 | 6/1987 | Poret | 371/25 |
| 4,796,258 | 1/1989 | Boyce | 371/16 |
| 4,821,269 | 4/1989 | Jackson et al. | 371/29.1 X |
| 4,843,608 | 6/1989 | Fu et al. | 371/68.1 |
| 4,943,969 | 7/1990 | Criswell | 371/68.1 |
| 5,043,990 | 8/1991 | Doi et al. | 371/68.1 |
| 5,228,039 | 7/1993 | Knoke | 371/19 |

OTHER PUBLICATIONS

Signal Analyzers, Model 3560A, Hewlett Packard Company Catalog, 1989, pp. 153–156.
PM 2260 Oscilloscope Signal Processing Software, Philips Prochure, 1989.
A500 Analog VLSI Test System, Teradyne, 1987.
Microprocessor System Development–MIME 600, Pentica Systems, Inc. Brochure, 1989.

*Primary Examiner*—Robert W. Beausoliel, Jr.
*Assistant Examiner*—Glenn Snyder
*Attorney, Agent, or Firm*—Koppel & Jacobs

[57] ABSTRACT

An emulation system used to debug software for a digital signal processor (DSP) includes a built-in digital signal analyzer which operates upon the same digital signals as those presented directly to and outputted by the DSP, bypassing the signal converters used to convert an input analog signal to digital format and the output digital signal to analog format. A host computer communicates with the digital signal analyzer via firmware in a control processor and personality board, or is alternately connected directly with the analyzer. Communications between the digital signal analyzer and the DSP are through the same contact probe as that used for the emulation software. The analyzer may be used to trigger a software function within the emulator based upon the real-time signal from the DSP, and is also capable of interpolating between successive digital values of an analyzed signal for display purposes.

8 Claims, 4 Drawing Sheets

REAL-TIME SIGNAL ANALYSIS APPARATUS AND METHOD FOR DIGITAL SIGNAL PROCESSOR EMULATION

BACKGROUND OF THE INVENTION

1. Field of the Invention

This invention relates to the emulation of digital signal processors (DSPs) for debugging associated software, and more particularly to real-time signal analysis performed on the DSP during the debugging operation.

2. Description of the Prior Art

DSPs are basically microcomputers that are designed to perform specific signal processing tasks under software control. For a typical single chip DSP application, the applications developer is presented with several debug and analysis challenges. This is due to the fact that the developer is not only designing a signal processing system, but is also writing software.

The process of software debugging starts with ensuring that the software cycles correctly on the DSP. Once this is accomplished, the engineer ensures that the correct signal processing occurs. Typically, this involves ad hoc and empirical measures of performance. If the correct signal processing is not occurring, the engineer must discover the source of the error. In general, errors may result from: a fundamental error in the signal processing algorithm; a data error in coefficients, parameters or constants; or a software bug. An analysis of signals provided to and outputted from the DSP can be useful in each of these error determination functions.

A conventional DSP software debug and signal analysis setup is illustrated in FIG. 1. An analog signal is provided by a signal generator 2 and delivered to an analog-to-digital converter (ADC) 4, which converts it to a digital format suitable for application as an input to the DSP 6. The output from the DSP is converted back to analog format by a digital-to-analog converter (DAC) 8.

Software under test is run on the DSP 6 by means of a conventional emulator system 10, which operates under the control of a host computer illustrated as personal computer 12 and applies the software program to the DSP via a contact probe 14 that includes a multi-wire cable 14. In practice, the user removes the DSP from his circuit board and replaces it with the emulator probe, which has a pinout identical to the DSP chip's pinout. The contact probe includes the same type of DSP as that removed from the board, and establishes a secure path between the replacement DSP and the emulator.

Conventional signal analysis is performed on the input and output signals to and from the DSP by means of a separate signal analyzer system 16. The signal analyzer 16 is connected to detect the analog signals at the input to ADC 4 and the output from DAC 8. The signal analysis is performed digitally, and the signal analyzer 16 includes internal ADCs to convert the detected analog signals to digital format for this purpose. Typical signal analyzers are the HP35660A Dynamic Signal Analyzer by the Hewlett Packard Company, and the PM2260 Oscilloscope Signal Processing Package by the Philips Company.

While necessary to analyze the operation of the DSP during the emulation process, the signal analyzer has several drawbacks. First, it is a stand-alone unit that is fairly expensive and adds significantly to the cost of the overall test apparatus. Also, the signal-to-noise ratio of the analog front-end analyzer is typically about 70 db, which is higher than the typical noise floor of ADC 4 and DAC 8; the signal analyzer 16 will thus be analyzing signals that are noisier than the actual digital signal seen by the DSP 6. In addition, since the signals delivered to signal analyzer 16 embrace both the DSP 6 and the ADC 4 and DAC 8, if a problem appears it may be difficult to determine whether it stems from the DSP itself or from one of the converters. Another limitation is that the signal analyzer 16 does not sample the input analog signal at the same points as the input to the DSP from ADC 4. This makes it very difficult to display "eye" patterns, which are cumulative traces of a succession of input signal patterns.

Signal analysis to test the operation of electrical systems other than DSPs is also frequently performed. In the A500 Analog VLSI Test System by Teradyne, Inc., analog or mixed analog/digital devices (rather than digital units) are tested. The test system includes a built-in DSP that determines whether the analog device is working properly. The DSP generates a digital stimulus signal which is converted to analog format and applied to the device under test; the output of the device under test is then converted back to digital format for analysis by the DSP. In another system, which is designed for the development of slow speed microcontrollers, a digital voltmeter is built into an emulator for the non-DSP microcontroller and used to read the current voltage level (Pentica Systems, Inc. MIME 600). These systems, however, are not applicable to the DSP emulation process.

SUMMARY OF THE INVENTION

The present invention seeks to provide a digital signal analyzer for a DSP emulation system that is more cost efficient than previous signal analyzers, introduces less noise into the signal analysis, is capable of segregating out the effects of the input ADC and output DAC from the DSP being analyzed, works with digital samples that correspond to the sample inputs to the DSP, and couples the software domain debug procedure with the real-time signal analysis procedure through a tightly copied cross-trigger mechanism.

These goals are accomplished by integrating a digital signal analyzer into the emulation system itself, and connecting it directly to the input and output of the DSP through the same probe used in the software debug operation. Since the digital signal analyzer is connected to the output of the ADC which feeds the DSP, and to the input of the DAC which receives output signals from the DSP, the signal analysis reflects the true operation of the DSP without distortion from the ADC and DAC.

The new digital analyzer configuration makes it possible to provide effective cross-coupling between the real-time signal analysis and the software domain debug procedures. A real-time signal from the DSP can be monitored by the signal analyzer and used to trigger software and/or hardware functions within the emulator upon the occurrence of a predetermined event in the monitored signal. The analyzer has the capability of accumulating a record of the real-time signal over time, and for triggering the software function when the accumulated record corresponds to a predetermined event. The signal analyzer is also capable of interpolating between successive digital values of an analyzed signal to display a smoothed version of the signal.

These and other features and advantages of the invention will be apparent to those skilled in the art from the following detailed description of preferred embodiments, taken together with the accompanying drawings, in which:

DETAILED DESCRIPTION OF PREFERRED EMBODIMENTS

Figure 1:
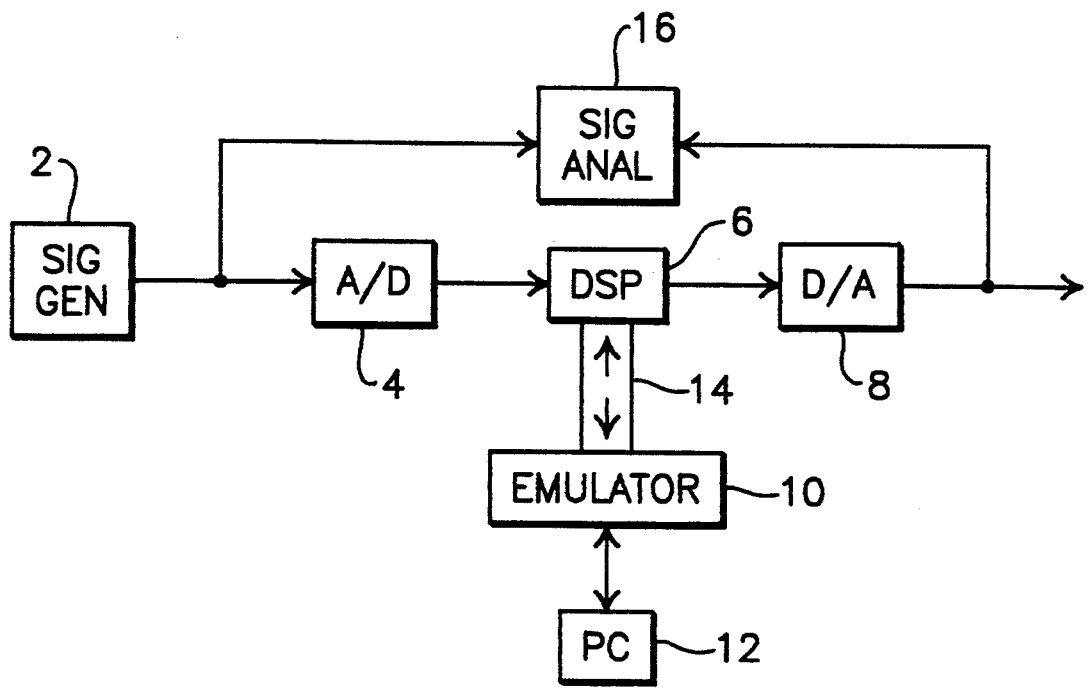
FIG. 1 is a block diagram of a prior DSP emulation system, discussed above.
Figure 2:
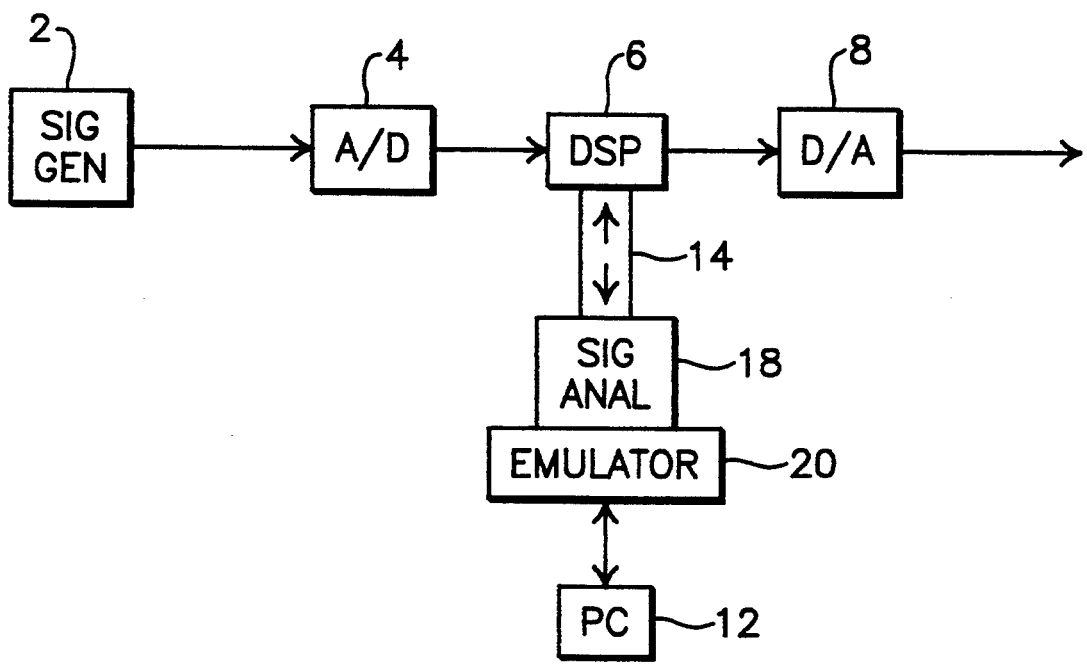
FIG. 2 is a block diagram of a DSP emulator system constructed in accordance with the present invention.

A block diagram illustrating the present approach to digital signal analysis for DSP emulation is provided in FIG. 2, in which elements that are the same as in the prior system of FIG. 1 are identified by the same reference numerals. In the new approach, a real-time signal analyzer 18 is integrated into a software domain emulator 20, and communicates directly with the DSP 6 under test. Communications between the signal analyzer 18 and DSP 6 are preferably through the same probe harness 14 used by the emulator 20. Although the full benefits of the invention are realized by integrating the signal analyzer with the emulator, if desired a separate interconnect could be provided between the signal analyzer and DSP.

Signal analyzer 18 thus operates from the same digital signals as those actually applied to and outputted from DSP 6. In other words, the signal analyzer is connected to the DSP sides of ADC 4 and DAC 8, rather than to their analog sides as in the prior art. This new configuration has several distinct advantages. It avoids the relatively high noise levels of the analog-based signal analyzers previously used, and also segregates the DSP under test from the noise and other effects of the input ADC 4 and output DAC 8. Thus, there is no ambiguity as to whether a particular effect detected by the signal analyzer reflects the influence of the converters rather than the DSP itself. For example, if the output signal does not match a desired pattern, the fault can now be definitely isolated to the DSP, whereas previously it might have been uncertain whether the DSP or one of the signal converters was causing the problem. Furthermore, operating directly with the DSP input and output allows for a synchronization between the DSP and signal analyzer that makes it much easier to calculate and display "eye" patterns, and makes it feasible to trigger software functions in the emulator based upon the real-time DSP signals.

Figure 3:
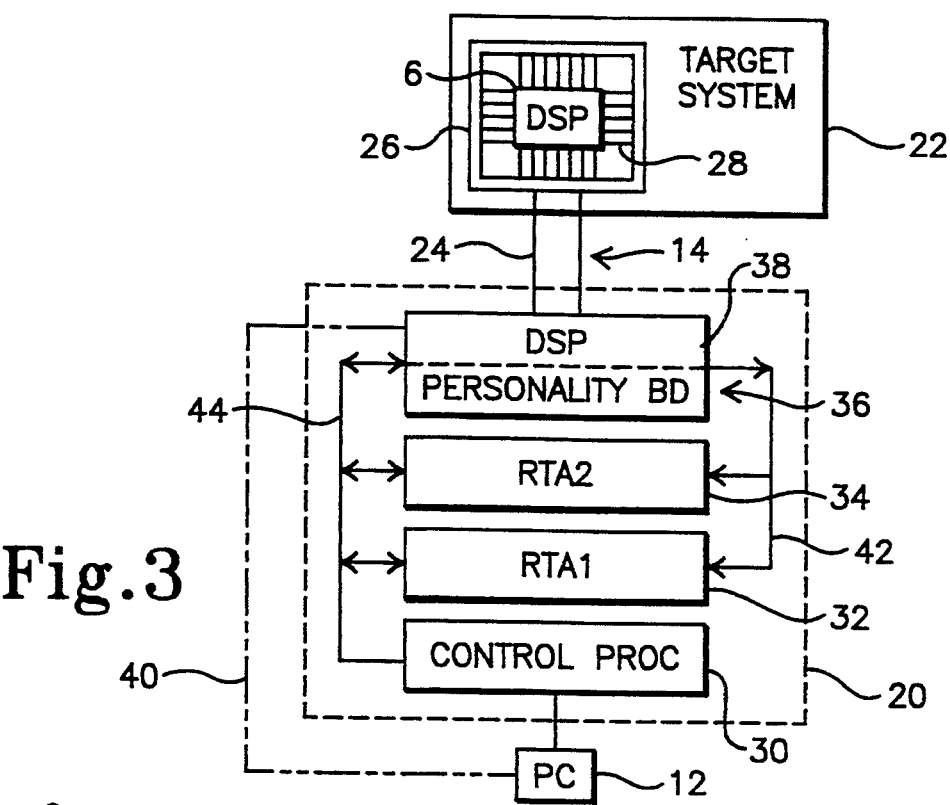
FIG. 3 is a block diagram of the system's hardware architecture.

A preferred hardware architecture for the new emulator/digital signal analyzer is shown in FIG. 3. The DSP 6 under test is illustrated as part of a target system, which is typically a larger circuit provided on a circuit board 22. The probe 14 includes a multi-wire cable 24 that expands into a contact ring 26 surrounding the DSP. Contacts with the individual DSP pins are made via a series of fine wire connectors 28, with each pin from which a signal is desired connecting to an individual lead wire that extends through the cable 24.

The emulator system 20, shown enclosed in dashed lines, includes a control processor 30, two digital real-time analyzer boards 32 and 34, and a "personality board" 36 supporting its own DSP microcomputer 38 that performs the functions of digital signal analyzer 18.

Other than the addition of the signal analyzer function, the "personality board" 36 is a conventional part of an emulator system. It is designed to make the system work with a particular DSP under test; in general, each different test DSP 6 will have a unique personality board. The control processor 30 is preferably a general purpose CPU with two high speed serial communications links, and acts as the local controller for the emulator. The real-time analyzers 32 and 34 may be implemented as conventional 144 bit by 8192 trace buffers with 8 bus event detectors and sequencers. Their function is to maintain digital signal histories. The personality board 36 contains all of the circuitry specific to the particular target processor, while the probe 14 contains all of the circuitry for interfacing the emulator to the target system 22.

The signal analyzer DSP 38 is preferably implemented as a small removable daughter board on the personality board. In one example it consists of a complete DSP system that includes a 64 Mhz ADSP-2101 DSP microcomputer by Analog Devices, Inc., 30 k words of external high speed SRAM, 1 megawords of sample memory, and a high speed interface to the personality board. It has two signal inputs and two signal outputs in a digital serial pulse code modulated (PCM) format that interface with the probe. All PCM protocols supported by the target processors are supported by the signal analyzer DSP 38.

The system is controlled by the user operated host computer 12, with the software emulation functions conducted in a conventional manner. The host computer 12 communicates with the digital signal analyzer DSP 38 through the control processor board and personality board firmware or, alternately as indicated by phantom line 40, it could communicate directly with the signal analyzer. Digital data is directed from the probe via the personality board 36 to the real-time analyzers 32 and 34 along path 42, in parallel with the signal analyzer DSP 38. The control processor 30 sends commands to and receives information back from the other boards along paths 44.

Figure 4:
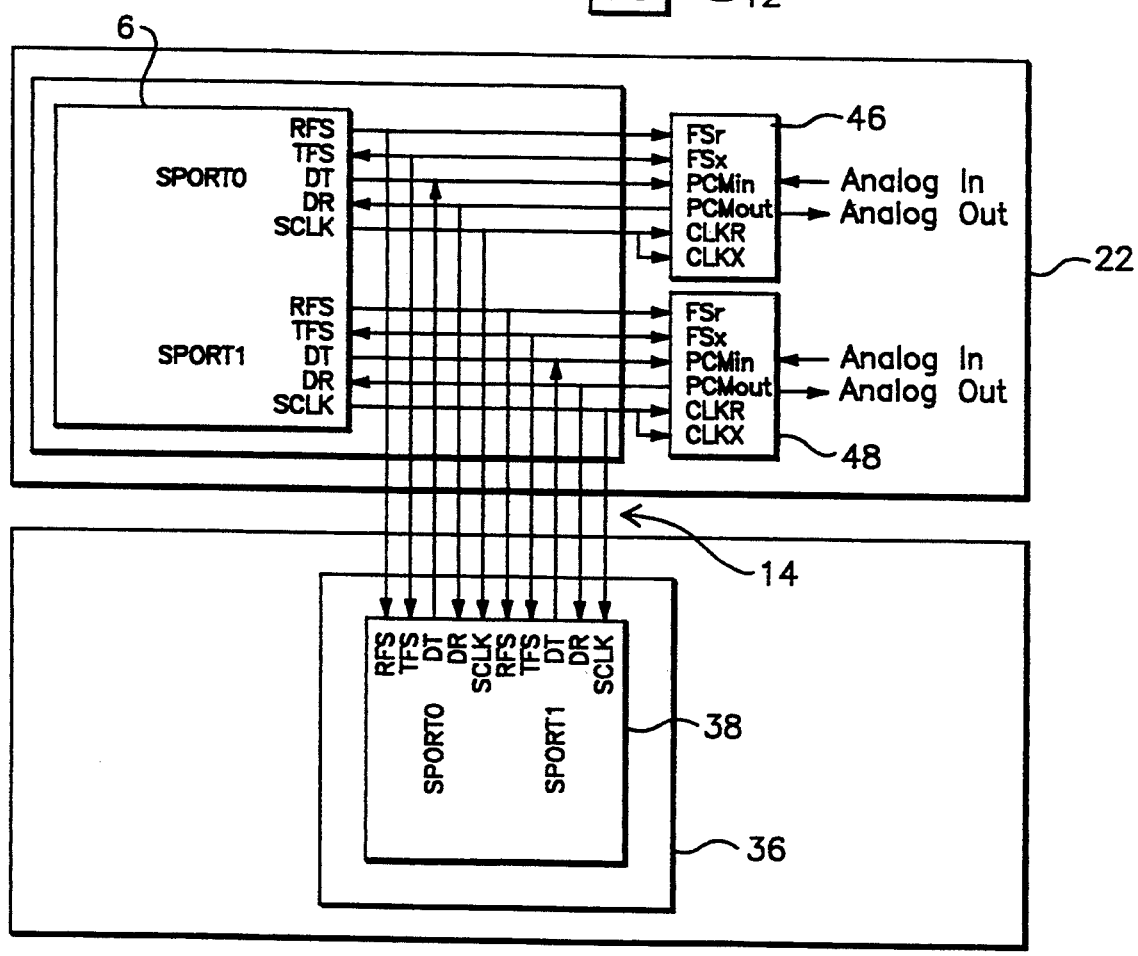
FIG. 4 is a wiring diagram of the digital signal analyzer data path architecture.

A simplified block diagram is given in FIG. 4 which demonstrates the non-intrusive nature of the PCM serial data path from the target system 22 to the signal analyzer DSP 38. This data path not only facilitates the continuous real-time acquisition and generation of PCM signals from and to the target system, but also allows the signal analyzer DSP 38 to function as an in-circuit device which performs its analysis upon the same samples of the analog input and output signals that are being processed by the target system. The in-circuit signal analyzer DSP 38 contributes no relative sampling phase or jitter and no additive instrumentation noise. It can accurately perform functions such as measuring channel noise floors and presenting "eye" pattern traces for datacomm channels.

A dual-input, dual-output system is illustrated in FIG. 4. The conversion functions of ADC 4 and DAC 8

(FIG. 2) are combined in CODECs 46 and 48, each of which converts an input analog signal into digital format for presentation to a respective serial port of target DSP 6 (SPORT 0 and SPORT 1), and a digital output from the test DSP 6 back to analog format. The digital signal analyzer 38 taps into the connections between test DSP 6 and CODECs 46, 48 via the probe 14.

The beginning of a data frame is identified by Receive Frame Sync (RFS) and Transmit Frame Sync (TFS) pins in the target DSP 6, which connect to the Frame Sync Receive (FSr) and Frame Sync Transmit (FSx) pins in the CODECs. Data Transmit (DT) and Data Receive (DR) pins in the DSP 6 are connected respectively to the input Pulse Code Modulated Input (PCMin) and to the Pulse Code Modulated Output (PCMout) pins in the CODECs. A master synchronizing clock signal for both transmitted and received data in the two synchronous serial ports is identified as the Synchronous Clock (SCLK) pins in DSP 6, and are connected to the Clock Receive (CLKR) and Clock Transmit (CLKX) pins in the CODECs.

Figure 5:
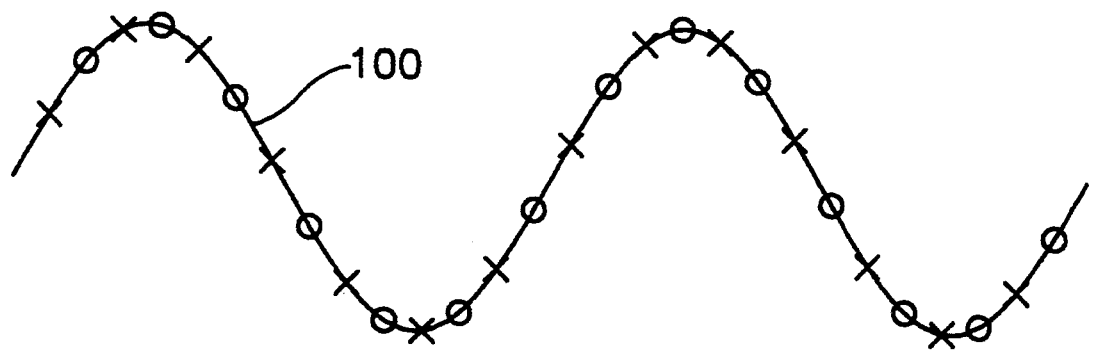
FIG. 5 is a segment of an analog signal comparing the data sampling of the present invention with that of prior digital signal analyzers used in connection with DSP emulation.

The difference in the sampling accomplished by the present and prior signal analyzers is illustrated in FIG. 5, in which an input analog signal is indicated by waveform 100. The waveform is periodically sampled by input ADC 4 at the points marked with an "x"; these same samples are provided to the digital signal analyzer of the present invention. With the prior approach the digital signal analysis, sampling within the signal analyzer 16 (FIG. 1) was not synchronized with the sampling of ADC 4 (or DAC 8), and accordingly typically resulted in samples that were out-of-phase with the sampling of ADC 4; illustrative prior signal analyzer samples are indicated in the figure by an "0". Further discrepancies result when the signal analyzer samples are not merely out-of-phase with the test DSP samples, but are also taken at a different sampling rate.

The emulator system's software architecture will now be discussed. The in-circuit signal analyzer is imbedded within the conventional in-circuit emulator. To facilitate user access to both analyzer and emulator features, graphical user interface software may be provided within the host computer 12 for both the signal analyzer and emulator, including a capability of rapidly switching between the two interfaces. The host computer 12 resident software communicates through a packet interface to firmware running on the control processor 30 (FIG. 3). The control processor 30 handles all communications with the host computer 12 and passes commands to the personality board 36 firmware, which in turn communicates with the digital signal analyzer DSP 38 and a monitor program running on the target probe 14 by writing/reading packets in shared memory locations. All acquisition, signal analysis and generation functions are performed by the digital signal analyzer DSP 38, which sends back rasterized data to the host computer software for display.

Low level emulator commands (such as register get and register set) are handled by the probe monitor program, while the personality board firmware handles housekeeping functions such as hardware setup. The system's control flow is master/slave, with the host computer 12 acting as master. Communication between the host computer software and the control processor firmware is initiated in the preferred embodiment by the host computer software, with the control processor initiating communications with the personality board. Communication between the personality board the probe monitor or the digital signal analyzer is initiated by the personality board.

Figure 6:
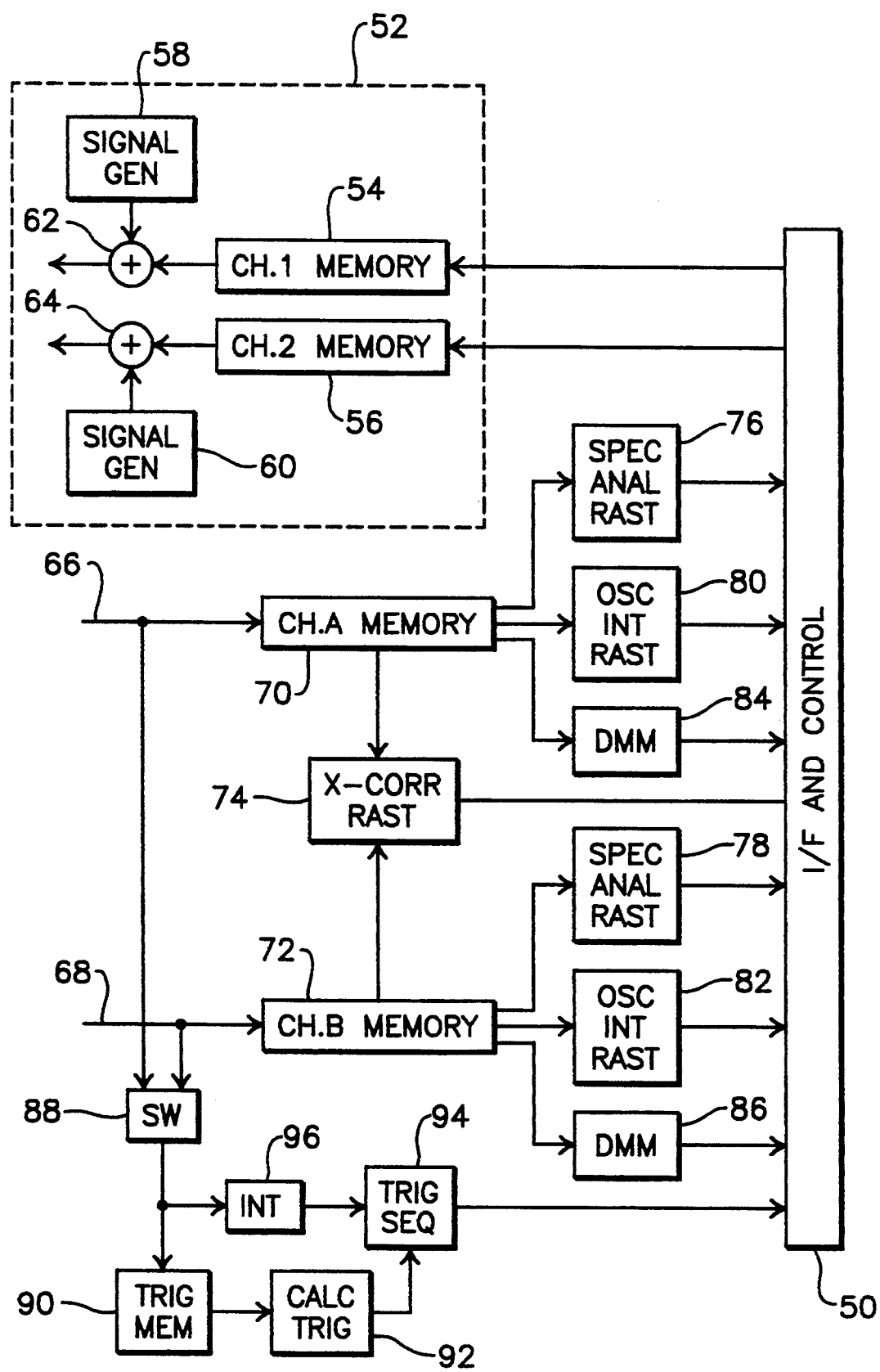
FIG. 6 is a block diagram of the digital signal analyzer's internal software.

The internal software architecture of the digital signal analyzer is illustrated in FIG. 6. An interface and control bus 50 provides an interface between the digital signal analyzer and the personality board firmware. The analyzer includes an input signal generator section 52 that can be used to generate a test signal to apply to the DSP 6 under test in case a test input signal is not available. The signal generator includes a pair of memory channels 54, 56 that can be programmed to store desired test signals. In one implementation, each channel has a 1,024 sample circular buffer memory that is written to statically by the host computer with a window of data that is precalculated and can be replayed any desired number of times. Each sample is read from the circular buffer as needed, based upon the output interrupts to the digital signal analyzer. A reference display in the host computer can be used to show the user the signal being generated and statistics associated with it.

A pair of signal waveform generators 58, 60 can also be used to generate test waveforms in real-time from stored programs. Test signal outputs are provided from each channel via summing nodes 62, 64, with the user selecting between the signals stored in the channel memories or the real-time generated signals for application to the summing nodes. Input signals from the DSP 6 under test are routed along channel input lines 66, 68 to channel A and channel B memories 70, 92, respectively. In one implementation, each channel has a 512 sample first-in, first-out (FIFO) circular buffer memory that is written to on each input ready interrupt associated with that channel, with the 512th oldest sample being lost. This relatively small memory capacity was selected because the display media in the host computer for this implementation had about 512 samples of horizontal display resolution, so that for display purposes any additional capacity in the channel memories would not be useful. Also, because the samples are of a band limited signal and the digital signal analyzer gathers the exact samples being processed by the DSP 6 under test, interpolated samples between each of the 512 samples may be calculated quickly in the digital signal analyzer as needed.

The digital signal analyzer serial ports run synchronously and complementary with the DSP 6 under test, and the signal analyzer's sampling rate is the same as in the user's system. The sampling rate may be limited, however, because of some sample-by-sample processing that occurs in the signal analyzer, mostly in the trigger calculations discussed below. Each channel's maximum rate is currently estimated to be about 2 million samples per second. The signal analyzer and digital multimeter functions discussed below are performed on a batch basis when required, rather than when each individual sample is received.

The channel memories 70, 72 hold recent histories of the sample data from the DSP 6 under test. The two channels may be cross-correlated and rasterized for display on the host computer in a conventional manner, indicated by function box 74. The information in each channel can be analyzed and displayed in various ways. In this example, each channel is subject to a spectral analysis and accompanying rasterization for display, identified by numerals 76, 78. The spectral processing options may include power spectrum density, magnitude and phase via fast Fourier transforms, histograms, cepstrum, auto-correlation and auto-coherence; cross-correlation, cross-coherence and cross-power spectrum density are available from the cross-correlation/rasterized function 74.

Traditional oscilloscope functions for signal display are performed in channel function blocks 80, 82. This function also preferably includes the ability to interpolate between the discrete sample points held in the channel memories to more smoothly reproduce the original input and output analog signals for display purposes. While the interpolation software is conventional, the in-circuit nature of the digital signal analyzer makes it feasible for the first time to use interpolation for an analog display of digital signals being analyzed in connection with DSP software emulation. These functional blocks also include a rasterize function for display on the host computer.

Digital multimeter (DMM) measurements are performed in functional blocks 84 and 86, based upon the same data available from the channel memories, and again displayed via the host computer. The DMM measurements may include peak-to-peak voltage, minimum and maximum voltages, mean and median voltages, RMS voltage, voltage variants, kurtosis and skewness, zero crossings and signal-noise ratio, all of which are calculated from the 512 sample channel memories.

The outputs from each of the signal analysis functions described above are applied to the interface/control bus 50. From there they communicate with the host computer 12 via the personality board and control processor firmware.

The digital signal processor also has the ability to trigger software functions in the emulator based upon the received digital signals. For example, if the spectral analyzer indicates the receipt of an audio signal, that can be used to trigger the collection of a software execution and instruction trace for the DSP under test. The trigger can also be used to initiate a real-time display of desired signals.

A software-controlled selector switch 88 chooses between the input signals on input channel lines 66 and 68 for delivery to a trigger memory 90, which may be a 128 sample FIFO circular buffer that holds samples from the trigger channel source for use in calculating trigger parameters. A Calculate Trigger function 92 operates upon the information stored in trigger memory 90 to determine when a trigger threshold level has been exceeded. The trigger parameters used in one implementation are absolute voltage level, RMS signal value, the mean of the stored signal values, and auto-correlation measures for signal-to-noise and noise-to-signal ratios. For absolute voltage level triggering, the signal values on a sample-by-sample basis are compared with a threshold. For this type of triggering, three sub-samples between each successive sample are preferably bandwidth interpolated with a 32 tap interpolator 96 to ensure that signals near the Nyquist rate do not have "hidden" trigger levels. For RMS and mean triggering, the trigger parameters are calculated from the samples stored in the trigger memory and compared with a threshold level. Signal and noise triggering use the auto-correlation function to make a qualitative determination of the signal or noise level within the overall signal. The trigger functions that are based upon calculated values (as opposed to a simple absolute voltage level trigger) are preferably coupled with a level trigger to ensure a seamless sequencing of the display of time domain signals.

The output from the Calculate Trigger function 92 is delivered to a Trigger Sequence function 94. This latter function controls the trigger sequence, and can be selected by the user. The trigger modes which it supports are Single, Norm and Auto. For single mode operation, when a trigger event occurs the display is updated and frozen until the trigger is manually rearmed. In the Norm mode, the display is updated and the trigger is automatically re-armed when a trigger event occurs. The Auto mode is the same as the Norm mode, except that if there is too long a period of time between updates an update will be forced regardless of the presence of a trigger signal. As an option, triggering can be coupled to RTA (FIG. 3, elements 32, 34) event recognizers as well. When this option is used, a signal domain trigger event can cause an emulator hardware action to take place as well. Options that may be included in this area are pre, post and center filling of the trace buffer before a break, single bus event tracing and output pulse generation.

Figure 7:
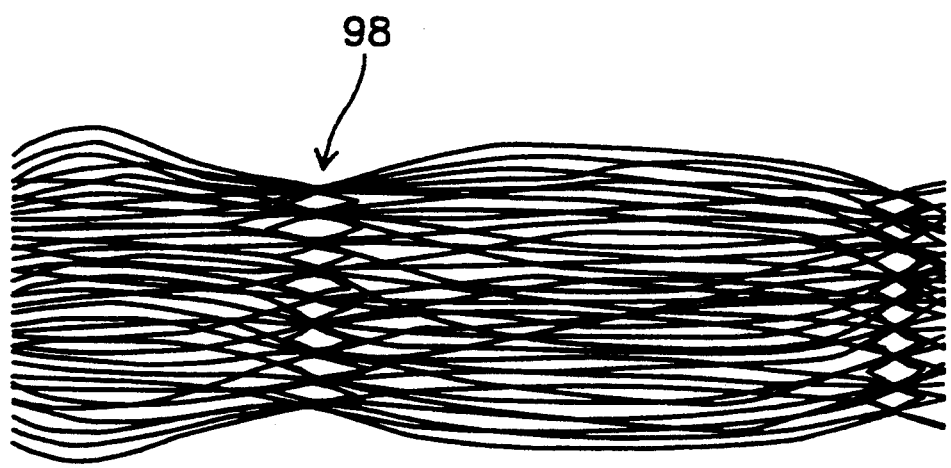
FIG. 7 is a trace of a typical "eye" signal pattern that can be achieved with the invention.

As mentioned previously, one of the advantages of the present invention is that it makes it possible to display "eye" patterns, which result from overlapped traces of thousands of successive signal patterns. An "eye" pattern trace is illustrated in FIG. 7. Because the carrier signal is modulated in distinct discrete sets of phase and amplitudes, certain areas of the display will never be traversed by a voltage trace; these areas are said to have the appearance of an eye, leading to the term "eye" pattern. Since the digital samples provided to the digital signal analyzer are the same as the samples processed by the DSP 6 under test, rather than being separated from the DSP by an input ADC 4 and output DAC 8, eye patterns can be displayed much more easily and reliably than with prior digital signal analyzers used in conjunction with DSP emulation.

While the present invention has been illustrated in connection with specific preferred embodiments, it should be understood that numerous variations and alternate embodiments will occur to those skilled in the art. Accordingly, it is intended that the invention be limited only in terms of the appended claims.

We claim:
1. In a digital signal processor (DSP) emulation system for debugging operational software to be run on the DSP, said system including an analog-to-digital converter (ADO) for sampling and converting an input analog signal to a digital format for presentation to a DSP upon which the software is run, a digital-to-analog converter (DAC) for converting a digital output from the DSP to analog format, and an emulator for applying operation software to the DSP for debugging the software, the improvement comprising:
 a digital signal analyzer which includes means for monitoring a real-time signal from the DSP and for triggering a software function within said emulator upon the occurrence of a predetermined monitored signal event, and
 a connector providing direct synchronous digital connections from said digital signal analyzer to the output of said ADC and to the input of said DAC for non-intrusively analyzing digital signals presented directly to the DSP, and digital signals outputted directly from the DSP after being operated upon by the software being debugged, said digital signal analyzer being synchronized to said ADC sampling through said collector.

2. The DSP emulation system of claim 1, wherein said emulator communicates with the DSP through a contact probe, and said digital signal analyzer is connected to the output of said ADC and to the input of said DAC through the same contact probe, said emulator and digital signal analyzer both being synchronized to said ADC sampling through said contact probe.

3. The DSP emulation system of claim 2, said digital signal analyzer comprising a DSP having hardware interfaces essentially similar to the DSP under test.

4. The DSP emulator system of claim 1, said digital signal analyzer including means for accumulating a record of said real-time signal over time, and for triggering said software function in response to a predetermined event associated with said accumulated signal record.

5. The DSP emulation system of claim 1, further comprising means for displaying signals from said digital signal analyzer, and means for interpolating between successive digital values of at least some of said signals to display a smoothed version of the signal.

6. A digital signal processor (DSP) emulation system for debugging software, comprising:
  a probe providing electrical signal connections to a DSP,
  a digital signal analyzer connected by said probe to access and analyze digital signals supplied to and outputted from the DSP, and
  an emulator communicating with the DSP via the same probe as said analyzer for applying software to be debugged to the DSP, said emulator and digital signal analyzer both being synchronized through said contact probe to said digital signals supplied to the DSP, said emulator including:
    a control processor controlling the operation of said digital signal analyzer and said emulator, and
    a host computer for providing operational commands to said control processor, said host computer communicating with said digital signal analyzer to display the results of said signal analysis,
  said digital signal analyzer communicating with said emulator to trigger software functions in the emulator in response to predetermined digital signal events accessed by said analyzer.

7. The DSP emulation system of claim 6, wherein said emulator includes personality circuitry interfacing between said emulator and said probe for rendering said emulator compatible with the DSP, said host computer communicating with the digital signal analyzer via firmware in said control processor and said personality circuitry.

8. The DSP emulation system of claim 7, said host computer communicating directly with the digital signal analyzer.

* * * * *